United States Patent
Okawa

[11] Patent Number: 6,143,680
[45] Date of Patent: Nov. 7, 2000

[54] DIELECTRIC CERAMIC COMPOSITION, PREPARATION METHOD THEREFOR, AND DIELECTRIC RESONATOR

[75] Inventor: Yoshihiro Okawa, Kokubu, Japan

[73] Assignee: Kyocera Corporation, Kyoto, Japan

[21] Appl. No.: 09/357,083

[22] Filed: Jul. 20, 1999

[30] Foreign Application Priority Data

Jul. 24, 1998 [JP] Japan .................. 10-209769
Oct. 29, 1998 [JP] Japan .................. 10-308625

[51] Int. Cl.⁷ ............................. C04B 35/465
[52] U.S. Cl. ............................. 501/136; 333/219.1
[58] Field of Search .................... 501/136, 135; 333/219.1

[56] References Cited

U.S. PATENT DOCUMENTS 4,670,409  6/1987  Okawa et al. .......................... 501/135
5,629,252  5/1997  Nishimoto et al. .................... 501/136
5,846,892  12/1998 Takada ................................ 501/136

*Primary Examiner*—Karl Group
*Attorney, Agent, or Firm*—Hogan & Hartson, LLP

[57] ABSTRACT

There is provided a dielectric ceramic composition containing metal elements Ca, Ti, La, Zn and M which is at least one metal element selected from the group consisting of W, Ni, Co, Zr, Sn, Mn and Cu, and represented on a molar fraction basis by the following composition formula:

$$a\text{CaO} \cdot b\text{TiO}_2 \cdot c\text{La}_2\text{O}_3 \cdot d\text{ZnO} \cdot e\text{MO}_x$$

wherein $1 \leq x \leq 3$, and a to e are molar fractions which are each set within a predetermined range. The composition has a high dielectric constant, a high Q value and a stably low resonant frequency temperature coefficient τf.

10 Claims, 1 Drawing Sheet

DIELECTRIC CERAMIC COMPOSITION, PREPARATION METHOD THEREFOR, AND DIELECTRIC RESONATOR

FIELD OF THE INVENTION

The present invention relates to a dielectric ceramic composition having a high Q value in a high frequency region such as of microwave and millimeter-wave and, more particularly, to a dielectric ceramic composition which can be used for various resonator materials, MIC dielectric substrate materials, dielectric waveguide materials, multi-layer ceramic capacitors and the like for use in a high frequency region such as of microwave and millimeter-wave. The invention further relates to a preparation method for such a dielectric ceramic composition and to a dielectric resonator.

BACKGROUND OF THE INVENTION

Dielectric ceramic materials have been used extensively for dielectric resonators, MIC dielectric substrates, waveguides and the like in a high frequency region such as of microwave and millimeter-wave. The dielectric ceramic materials are generally required to have the following three principal properties:

(1) A high dielectric constant to meet a demand for size reduction of devices, because the wavelength is reduced to $1/\epsilon r^{1/2}$ in a dielectric;
(2) A small dielectric loss in the high frequency region, i.e., a high Q value; and
(3) A small change in resonant frequency with respect to a temperature change, i.e., a stably low temperature dependence of the dielectric constant.

Exemplary dielectric ceramic materials hitherto known include oxide ceramic materials such as $BaO$—$TiO_2$ based materials, $BaO$—$REO$—$TiO_2$ (wherein REO is an oxide of a rare earth element) based materials and $MgTiO_3$—$CaTiO_3$ based materials (see Japanese Unexamined Patent Publications No. 61-10806 (1985), No. 63-100058 (1988) No. 60-19603(1985)).

Although the $BaO$—$TiO_2$ based materials have a dielectric constant $\epsilon r$ of 37 to 40 and a high Q value on the order of 40,000, it is difficult to achieve a resonant frequency temperature coefficient $\tau f$ of zero in a single phase (the resonant frequency temperature coefficient $\tau f$ represents the temperature dependence of the dielectric constant). Further, these materials suffer from a great change in the dielectric constant and the temperature dependence of the dielectric constant with respect to a change in the composition thereof. Therefore, it is difficult to stably reduce the resonant frequency temperature coefficient $\tau f$ while ensuring a high dielectric constant and a low dielectric loss.

Known as the $BaO$—$REO$—$TiO_2$ based materials are $BaO$—$Nd_2O_3$—$TiO_2$ based materials and $BaO$—$Sm_2O_3$—$TiO_2$ based materials. These materials have a dielectric constant $\epsilon r$ of 40 to 60, and some of them have a resonant frequency temperature coefficient $\tau f$ of zero. However, the materials have a low Q value on the order of 5,000 or lower.

The $MgTiO_3$—$CaTiO_3$ based materials have a high Q value on the order of 30,000, and some of them have a resonant frequency temperature coefficient $\tau f$ of zero. However, the materials have a low dielectric constant on the order of 16 to 25.

Therefore, none of the above materials perfectly satisfy the aforesaid three principal properties required of the dielectric material for high frequency applications.

SUMMARY OF THE INVENTION

It is a main object of the present invention to provide a dielectric ceramic composition which has a high dielectric constant, a high Q value and a stably low temperature dependence of the dielectric constant.

It is another object of the invention to provide a preparation method for the aforesaid dielectric ceramic composition, and to provide a dielectric resonator employing the dielectric ceramic composition.

As a result of intensive studies to solve the aforesaid problems, the inventor of the present invention has newly found that a dielectric ceramic composition containing at least Ca, Ti, La, Zn and M (which is at least one element selected from the group consisting of W, Ni, Co, Zr, Sn, Mn and Cu) as metal elements in a certain composition ratio has a high dielectric constant, a high Q value, a stably low temperature dependence of the dielectric constant in the high frequency region.

More specifically, there is provided a dielectric ceramic composition represented on a molar fraction basis by the following composition formula:

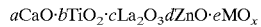

wherein M is as defined above $1 \leq x \leq 3$; and a to e are molar fractions defined as $0.050 \leq a \leq 0.320$, $0.150 \leq b \leq 0.470$, $0.100 \leq c \leq 300$, $0.100 \leq d \leq 0.300$ and $0 < e \leq 0.250$, respectively (a+b+c+d+e=1).

In the aforesaid formula, the molar fractions a, b, c, d and e preferably satisfy the following expression:

$$0.40 \leq \{a+(c/2)\}/\{(b/2)+d+e\} < 1.00$$

Thus, the composition has an improved Q value.

The dielectric ceramic composition preferably contains plate crystals after having been formed into a predetermined shape and sintered. Thus, the composition has a further improved Q value.

A preferred example of the dielectric ceramic composition according to the present invention, in which the metal element M is tungsten W, is represented by the following composition formula:

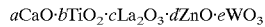

(wherein a, b, c, d and e are as defined above), and contains plate crystals.

The plate crystals contain a greater amount of the metal element M, preferably tungsten W, than the other crystals in the composition, and are preferably present in a proportion of 0.02 to 10 vol % in the dielectric ceramic composition.

The dielectric ceramic composition is prepared by mixing oxides of the respective metal elements constituting the aforesaid composition formula, forming the resulting mixture into a predetermined shape, and firing the resulting formed product at a temperature of 1,400 to 1,650° C.

The dielectric ceramic composition containing the plate crystals is prepared by firing the formed product at a temperature of 1,400 to 1,650° C., and then reducing the firing temperature at a rate of 2 to 300° C. per hour.

In accordance with the present invention, there is also provided a dielectric resonator which comprises a resonator medium of a predetermined shape composed of the aforesaid dielectric ceramic composition, and a pair of input and output terminals disposed on opposite sides of the resonator medium for applying a high frequency signal to the resonator medium so as to resonate the resonator medium at a predetermined resonant frequency.

Other objects and advantages of the present invention will become apparent from the following detailed description.

DETAILED DESCRIPTION OF THE INVENTION

Figure 1:
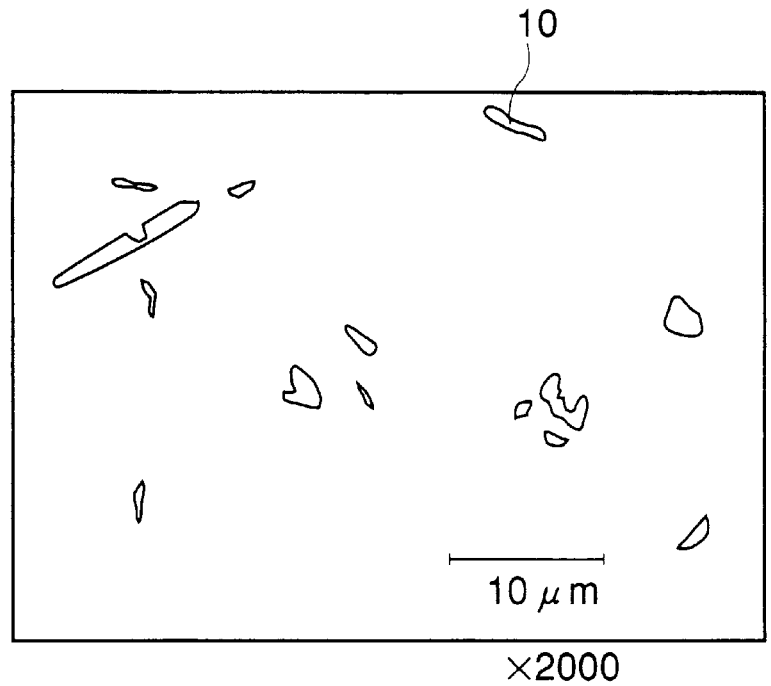
FIG. 1 is a schematic trace of an exemplary photograph illustrating crystals in a composition according to the present invention.

In the composition formula $aCaO \cdot bTiO_2 \cdot cLa_2O_3 \cdot dZnO \cdot eMO_x$ representing the dielectric ceramic composition of the present invention, the molar fractions a, b, c, d and e are set within predetermined ranges. This is based on the following ground.

The molar fraction "a" is defined as $0.050 \leq a \leq 0.320$. If a<0.050, the Q value and the resonant frequency temperature coefficient $\tau f$ are reduced. If a>0.320, the Q value is reduced and the $\tau f$ value is increased. Particularly, it is desirable that the molar fraction "a" is defined as $0.100 \leq a \leq 0.270$.

The molar fraction "b" is defined as $0.150 \leq b \leq 0.470$. If b<0.150, the Q value is reduced. If b>0.470, the Q value is reduced and the $\tau f$ value is increased. Particularly, it is desirable that the molar fraction "b" is defined as $0.200 \leq b \leq 0.420$.

The molar fraction "c" is defined as $0.100 \leq c \leq 0.300$. If c<0.100, the Q value is reduced and the $\tau f$ value is increased. If c>0.300, the Q value is reduced. Particularly, it is desirable that the molar fraction "c" is defined as $0.120 \leq c \leq 0.270$.

The molar fraction "d" is defined as $0.100 \leq d \leq 0.300$. If d<0.100, the Q value is reduced and the $\tau f$ value is increased. If d>0.300, the Q value is reduced. Particularly, it is desirable that the molar fraction "d" is defined as $0.120 \leq d \leq 0.270$.

The molar fraction "e" is defined as $0 < e \leq 0.250$. If e=0, the Q value is reduced and the $\tau f$ value is increased. If e>0.250, the Q value is reduced. Particularly, the molar fraction "e" is desirably defined as $0.001 \leq e \leq 0.200$, more desirably $0.003 \leq e \leq 0.200$.

For improvement of the Q value, the molar fractions preferably satisfy the following expression:

$$0.40 \leq \{a+(c/2)\}/\{(b/2)+d+e\} \leq 1.00,$$

particularly desirably the following expression:

$$0.45 \leq \{a+(c/2)\}/\{(b/2)+d+e\} \leq 0.95$$

In the present invention, the metal element M to be contained in the composition is at least one element selected from the group consisting of W, Ni, Co, Zr, Sn, Mn and Cu. This is based on the following ground:

In general, CaTiLaZn based ceramic compositions tend to have a great positive $\tau f$ value, so that it is difficult to control the $\tau f$ value at about zero while ensuring a higher dielectric constant and a higher Q value. In the present invention, at least one element selected from W, Ni, Co, Zr, Sn, Mn and Cu is added to a CaTiLaZn based ceramic composition, whereby the $\tau f$ value is successfully controlled at about zero while the dielectric constant and the Q value are maintained at high levels. It is particularly preferred to use W.

In the present invention, the dielectric ceramic composition preferably contains plate crystals, typically, in a proportion of 0.02 to 10 vol %. If the content of the plate crystals is lower than 0.02 vol % or greater than 10 vol %, the Q value may be reduced.

The dielectric ceramic composition containing the plate crystals is prepared by mixing oxides of the respective metal elements constituting the aforesaid formula in a predetermined ratio, forming the resulting mixture into a predetermined shape, firing the resulting formed product at a firing temperature of 1,400 to 1,650° C., and then reducing the firing temperature at a temperature reduction rate of 2 to 300° C. per hour.

The amount of the plate crystals to be formed in the composition can be controlled within the aforesaid range by controlling the temperature reduction rate at 2 to 300° C. per hour during the firing, whereby the Q value is improved. The firing temperature is desirably reduced at a temperature reduction rate of 2 to 300° C. per hour, more desirably 4 to 70° C. per hour, from the maximum firing temperature to 800° C. Thus, the Q value is further improved. If the temperature reduction rate is greater than 300° C. per hour, the plate crystals do not sufficiently grow, resulting in a lower Q value.

In the present invention, the plate crystals are defined as follows. When a surface of the dielectric ceramics which has been polished to planarity and mirror-finished is photographed by means of a wavelength dispersive X-ray microanalyzer at an acceleration voltage of 15 kV, a probe current of $5 \times 10^{-10}$ A and a magnification of about 1,000 to 5,000 to obtain a reflective electron image photograph, crystals more whitish than the other crystals are observed in the photograph. These whitish crystals are planer and have various shapes such as T-, L-, trapezoidal and polygonal shapes. Some of the whitish crystals may have projections and indentations, curves, deformations, voids and the like. The crystals have dimensions of about 1 to 100 μm as measured along the longest axis, about 0.5 to 30 μm as measured along the second longest axis and about 0.1 to 10 μm as measured along the shortest axis. When the mirror-finished surface is observed by means of the wavelength dispersive X-ray microanalyzer by application of a characteristic X-ray at an acceleration voltage of 15 kV and a probe current of $1.0 \times 10^{-7}$ A, it is found that the whitish crystals contain a greater amount of the metal element M (e.g., W) than the other crystals. Thus, the plate crystals are herein defined as crystals which look whitish in a reflective electron image photograph and contain a greater amount of the metal element M than the other crystals.

FIG. 1 is a trace of a reflective electron image photograph taken at a magnification of 2,000. In FIG. 1, whitish crystals indicated by a reference numeral 10 are the plate crystals.

The presence of the plate crystals and the presence of the metal M in the plate crystals are confirmed in the following manner. A surface of the dielectric ceramics is polished to planarity and mirror-finished, and the mirror-finished surface is photographed by means of a wavelength dispersive X-ray microanalyzer at an acceleration voltage of 15 kV, a probe current of $5 \times 10^{-10}$ A and a magnification of about 1,000 to 5,000 to obtain a reflective electron image photograph. The presence of the plate crystals is confirmed by presence of more whitish portions than the other portions in the photograph. The presence of the metal M (particularly, W) in the plate crystals is determined by application of a characteristic X-ray at an acceleration voltage of 15 kV and a probe current of $1.0 \times 10^{-7}$ A.

The proportion of the plate crystals is determined on the basis of volume percentage by determining the area ratio of plate crystal portions in a reflective electron image photograph. The reflective electron image photograph is taken by means of a wavelength dispersive X-ray microanalyzer at an acceleration voltage of 15 kV, a probe current of $5 \times 10^{-10}$ A and a magnification of about 1,000 to 5,000. The area ratio of the plate crystal portions 10 in the photograph shown in FIG. 1 is determined by an image analysis (e.g. tradename "LUZEX" manufactured by NIRECO Co., or the like) or a photograph tracing method. Where the area ratio of the plate crystals is determined through the image analysis, for example, it is necessary to trace only the plate crystal portions in the photograph on a paper sheet prior to the image analysis for elimination of influences of voids and grain omission.

The determination of the area ratio of the plate crystals by the photograph tracing method is achieved in the following manner. The plate crystal portions and the other portions in the photograph are separately traced on a homogeneous paper sheet, for example, a cross-ruled sheet, and the area ratio of the plate crystal portions in the trace is determined on the basis of the grid scale. Alternatively, the plate crystal portions in the trace on the paper sheet are cut out and weighed, and the ratio of the total weight of the cut-out plate crystal portions to the weight of the other trace portions is determined as the area ratio of the p late crystals.

Since a sintered product having a smaller number of oxygen vacancies generally has an improved Q value, the following is supposedly the reason why the presence of the plate crystals improves the Q value in the invention.

The amount of the plate crystals formed in the sintered product and the Q value differ depending on the temperature reduction rate in the firing process even with the same content of the metal element M. Therefore, it is considered that the temperature reduction rate is correlated with the amount of the formed plate crystals and the Q value. More specifically, the plate crystals containing the metal element M are properly formed in the sintered product by controlling the temperature reduction rate within a certain range, whereby the oxygen vacancies in the sintered product are reduced to improve the Q value. If the temperature reduction rate is too high, the formation of the plate crystals may be insufficient, resulting in a greater number of oxygen vacancies and hence a lower Q value. If the temperature reduction rate is too low, conversely, the formation of the plate crystals may be undesirably increased to greater than the aforesaid range, and the composition may be changed due to evaporation and reactions with firing jigs, whereby the Q value is reduced. In addition, the time required for the firing process is prolonged, so that mass production is impossible. if the amount of the formed plate crystals is greater than the aforesaid range, the sintered product may have a lower Q value because the Q value of the plate crystals is low.

In the present invention, the amount of the plate crystals to be formed in the dielectric ceramic composition is controlled within the aforesaid range by controlling the temperature reduction rate at 2 to 300° C. per hour, whereby the Q value is improved.

The dielectric ceramic composition of the present invention can be prepared, for example, in the following manner. Highly pure powdery calcium carbonate ($CaCO_3$) titanium oxide ($TiO_2$), lanthanum oxide ($La_2O_3$), zinc oxide (ZnO), and the oxide of the metal element M [at least one oxide selected from tungsten oxide ($WO_3$) nickel oxide (NiO), cobalt oxide (CoO), zirconium oxide ($ZrO_2$), tin oxide ($SnO_2$), manganese carbonate ($MnCO_3$) and copper oxide (CuO)] are used as starting materials. These powdery starting materials are weighed and blended in a predetermined ratio, and pure water is added to the resulting blend, which is in turn mixed and milled in wet process for about 10 to 30 hours until the average particle diameter of the blended materials is reduced to 2.0 m or smaller. A ball milling which employs zirconia balls, for example, is used for the wet mixing and milling process.

The resulting mixture of the powdery materials is dried, and pre-fixed at 1,000 to 1,300° C. for 2 to 10 hours. Then, 5 wt % of a binder is added to the pre-fired mixture, which is in turn granulated. The resulting powder is formed into a given shape by known forming means, for example, by mold press, cold hydrostatic press, extrusion or the like, and then the formed product is fired in an air atmosphere at a temperature of 1,400 to 1,650 C for 1 to 100 hours. After the firing, the firing temperature is preferably reduced at the predetermined temperature reduction rate as described above.

It is noted that impurities such as $SiO_2$, $Al_2O_3$ and other rare earth elements may be contained in an amount of not greater than 1 wt % in the resulting product, depending on the kinds of the starting materials to be used, the in of the milling balls and other preparation conditions.

Figure 2:
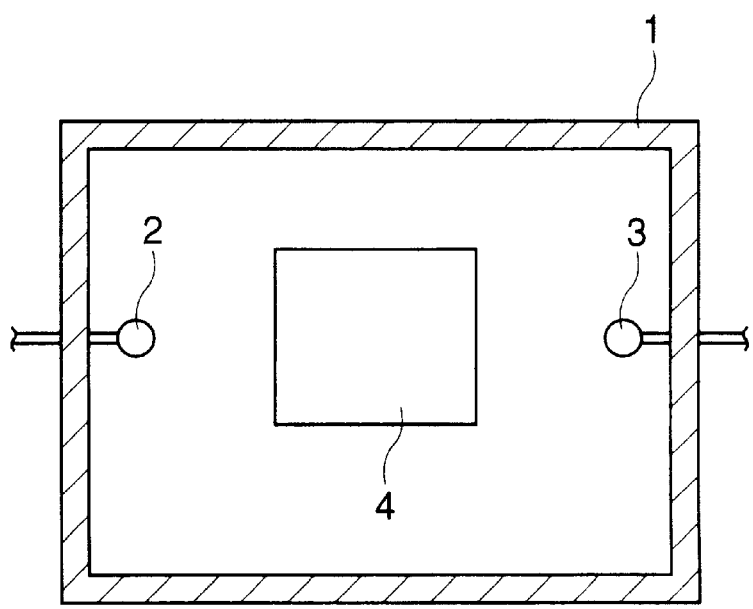
FIG. 2 is a sectional diagram illustrating one embodiment of a dielectric resonator according to the present invention.

The dielectric resonator according to the present invention, which may be of a TE mode type as shown in FIG. 2, comprises a metallic case 1, an input terminal 2 and an output terminal 3 provided on opposed interior surfaces of the metal case 1, and a dielectric ceramic body 4 composed of the aforesaid dielectric ceramic composition as a resonator medium and disposed between the input and output terminals 2 and 3. In such a TE mode dielectric resonator, microwaves inputted through the input terminal 2 are reflected on an interface between the dielectric ceramic body 4 and a free space thereby to be confined within the dielectric ceramic body 4, which in turn resonates at a predetermined frequency. A signal generated in this manner is electromagnetically coupled to the output terminal 3 thereby to be outputted therethrough.

Needless to say, the dielectric ceramic composition of the present invention is applicable to TEM-mode coaxial resonators and strip line resonators, TM-mode dielectric ceramic resonators, and other resonators. Further, the dielectric resonator may be constructed such that the input terminal 2 and the output terminal 3 are provided directly on the dielectric ceramic body 4.

The dielectric ceramic body 4, which is a resonator medium composed of the dielectric ceramic composition of the invention, has a predetermined shape, for example, rectangular solid, cube, disk, cylinder, polygonal column or a like solid which allows for resonance of the resonator body. It is preferred in practice that the frequency of the high frequency signal to be inputted is about 200 MHz to about 300 GHz and the resonant frequency is about 300 MHz to about 100 GHz.

The dielectric resonator of the invention can advantageously be applied to resonators, MIC dielectric substrates, dielectric waveguides, dielectric antennas and any of various electronic components which are operative in microwave and millimeter-wave regions, for example, for car telephones, cordless telephones, personal wireless units, satellite broadcast receivers and the like.

EXAMPLES

The dielectric ceramic composition of the present invention will hereinafter be described by way of examples thereof. It should be understood that the invention be not limited to these examples.

Example 1

Highly pure calcium carbonate ($CaCO_3$), titanium oxide ($TiO_2$), lanthanum oxide ($La_2O_3$) and zinc oxide ($ZnO$) were used as essential starting materials. Powdery tungsten oxide ($WO_3$), nickel oxide ($NiO$), cobalt oxide ($CoO$), zirconium oxide ($ZrO_2$), tin oxide ($SnO_2$) manganese carbonate ($MnCO_3$) and copper oxide ($CuO$) were each used as another starting material $MO_x$ (wherein M and x are as defined above) to be mixed with the essential starting materials.

These starting materials were weighed and blended in molar ratios listed in Tables 1 and 2, and pure water was added to the resulting blend, which was in turn mixed and milled in wet process for about 20 hours by means of a ball mill until the average particle diameter of the blended materials was reduced to 2.0 μm or smaller. It is noted that the molar ratios of $CaCO_3$ and $MnCO_3$ correspond to the molar fractions of $CaO$ and $MnO_2$, respectively, shown in the tables, and a molar fraction e in Table 2 is the total of molar fractions ①, ② and ③.

The mixture was dried, and pre-fired at 1,150° C. for 2 hours. The n, 5 wt % of a binder was added to the pre-fired mixture, which was in turn granulated. The resulting powder was press-molded at a pressure of about 1 ton/cm² into a cylindrical form, which was in turn fired in an air atmosphere at a temperature of 1,450 to 1,650° C. for 2 hours.

A flat surface of the resulting ceramic product was polished to planarity, and ultrasonically washed in acetone. After the ceramic product is dried at 15020 C. for one hour, the dielectric constant εr, Q value and resonant frequency temperature coefficient τf of the ceramic product were measured at a measurement frequency of 3 to 4 GHz by a cylinder resonator method.

The Q value thus obtained was converted to a Q value at 1 GHz on the basis of the following relation:

$$Q \text{ value} \times \text{Measurement frequency } f = \text{Constant}$$

which has been generally established for microwave dielectric materials. The resonant frequency temperature coefficient τf was measured in a temperature range of 20 to 85° C. The results are also shown in Tables 1 and 2.

As apparent from Tables 1 and 2, dielectric ceramic products of comparative examples each had a lower dielectric constant and/or a lower Q value, or a τf value of lower than −30 ppm/° C. or greater than 50 ppm/° C.

On the contrary, dielectric ceramic products obtained in accordance with the present invention each had excellent dielectric characteristics, i.e., a dielectric constant of not lower than 45, a Q value of not lower than 20,000 at 1 GHz and a τf value of −30 to +50 ppm/° C. With substantially the same molar fractions a, b, c and d, dielectric ceramic products having a greater content (molar fraction e) of $MO_x$ (wherein M and x are as defined above) had a higher dielectric constant and a higher Q value, and a τf value of virtually zero. This is evident from a comparison among Samples No. 15, No. 16 and No. 17, a comparison among samples No. 47, No. 48 and No. 49, and the like.

It is noted that the molar fractions of the respective metal oxides in each ceramic product sample shown in Tables 1 and 2 were the same as those in the starting formulation.

TABLE 1

| Sample No. | a CaO | b $TiO_2$ | c $La_2O_3$ | d ZnO | e $WO_3$ | (a + c/2)/ (b/2 + d + e) | Dielectric Constant εr | Q value | τf (ppm/° C.) |
|---|---|---|---|---|---|---|---|---|---|
| 1 | 0.320 | 0.380 | 0.100 | 0.100 | 0.100 | 0.949 | 66.3 | 21000 | 49.0 |
| 2 | 0.270 | 0.240 | 0.150 | 0.170 | 0.170 | 0.750 | 50.5 | 36000 | −11.7 |
| 3 | 0.100 | 0.370 | 0.260 | 0.260 | 0.010 | 0.505 | 48.2 | 39000 | −23.8 |
| 4 | 0.050 | 0.360 | 0.300 | 0.260 | 0.030 | 0.426 | 45.0 | 22000 | −30.0 |
| 5 | 0.280 | 0.470 | 0.110 | 0.110 | 0.030 | 0.893 | 65.1 | 20000 | 50.0 |
| 6 | 0.220 | 0.420 | 0.170 | 0.170 | 0.020 | 0.763 | 63.5 | 35000 | 11.3 |
| 7 | 0.240 | 0.200 | 0.210 | 0.200 | 0.150 | 0.767 | 48.0 | 31000 | −19.9 |
| 8 | 0.140 | 0.150 | 0.270 | 0.270 | 0.170 | 0.534 | 46.7 | 24000 | −28.1 |
| 9 | 0.200 | 0.250 | 0.300 | 0.200 | 0.050 | 0.933 | 45.8 | 22000 | −27.3 |
| 10 | 0.100 | 0.370 | 0.270 | 0.240 | 0.020 | 0.528 | 45.6 | 38000 | −9.6 |
| 11 | 0.270 | 0.390 | 0.120 | 0.190 | 0.030 | 0.795 | 52.2 | 36000 | 0.0 |
| 12 | 0.250 | 0.270 | 0.100 | 0.180 | 0.200 | 0.583 | 46.9 | 20000 | −25.2 |
| 13 | 0.080 | 0.350 | 0.267 | 0.300 | 0.003 | 0.447 | 45.0 | 23000 | −29.4 |

TABLE 1-continued

| Sample No. | a CaO | b TiO$_2$ | c La$_2$O$_3$ | d ZnO | e WO$_3$ | (a + c/2)/ (b/2 + d + e) | Dielectric Constant εr | Q value | τf (ppm/° C.) |
|---|---|---|---|---|---|---|---|---|---|
| 14 | 0.200 | 0.200 | 0.250 | 0.270 | 0.080 | 0.722 | 54.4 | 39000 | 17.5 |
| 15 | 0.293 | 0.420 | 0.135 | 0.147 | 0.005 | 0.996 | 53.0 | 35000 | 41.8 |
| 16 | 0.282 | 0.412 | 0.130 | 0.126 | 0.050 | 0.908 | 53.7 | 36000 | 20.5 |
| 17 | 0.250 | 0.385 | 0.115 | 0.110 | 0.140 | 0.695 | 53.5 | 37000 | 0.0 |
| 18 | 0.250 | 0.300 | 0.200 | 0.100 | 0.150 | 0.875 | 46.8 | 26000 | −28.7 |
| 19 | 0.080 | 0.150 | 0.290 | 0.230 | 0.250 | 0.405 | 48.9 | 20000 | −30.0 |
| 20 | 0.225 | 0.225 | 0.175 | 0.175 | 0.200 | 0.641 | 45.1 | 39000 | 0.0 |
| 21 | 0.260 | 0.380 | 0.130 | 0.227 | 0.003 | 0.774 | 51.7 | 40000 | −5.9 |
| 22 | 0.215 | 0.400 | 0.190 | 0.194 | 0.001 | 0.785 | 55.7 | 35000 | 10.3 |
| *23 | 0.380 | 0.350 | 0.100 | 0.100 | 0.070 | 1.246 | 83.2 | 3000 | 287.3 |
| *24 | 0.010 | 0.150 | 0.300 | 0.300 | 0.240 | 0.260 | Unmeasurable | | |
| *25 | 0.310 | 0.520 | 0.080 | 0.080 | 0.010 | 1.000 | 132.5 | 1000 | 360.2 |
| *26 | 0.320 | 0.100 | 0.200 | 0.200 | 0.180 | 0.977 | Unmeasurable | | |
| *27 | 0.200 | 0.150 | 0.350 | 0.250 | 0.050 | 1.000 | 29.7 | 2000 | −49.4 |
| *28 | 0.200 | 0.450 | 0.050 | 0.200 | 0.100 | 0.429 | 142.0 | 1000 | 585.8 |
| *29 | 0.100 | 0.300 | 0.200 | 0.350 | 0.050 | 0.364 | 26.5 | 4000 | −47.2 |
| *30 | 0.320 | 0.350 | 0.200 | 0.050 | 0.080 | 1.377 | 122.8 | 6000 | 316.9 |
| *31 | 0.100 | 0.200 | 0.300 | 0.100 | 0.300 | 0.500 | Unmeasurable | | |
| *32 | 0.250 | 0.300 | 0.250 | 0.200 | 0.000 | 1.071 | 47.0 | 6000 | 66.1 |

Sample Numbers prefixed with * are comparative examples.

TABLE 2

| Sample No. | a CaO | b TiO$_2$ | c La$_2$O$_3$ | d ZnO | e MO$_x$ ① | ② | ③ | ① + ② + ③ | (a + c/2)/ (b/2 + d + e) | Dielectric Constant εr | Q value | τf (ppm/° C.) |
|---|---|---|---|---|---|---|---|---|---|---|---|---|
| 33 | 0.320 | 0.380 | 0.100 | 0.100 | 0.100 NiO | — | — | 0.100 | 0.949 | 67.7 | 21000 | 49.5 |
| 34 | 0.270 | 0.240 | 0.150 | 0.170 | 0.170 CoO | — | — | 0.170 | 0.750 | 53.9 | 33000 | −5.7 |
| 35 | 0.100 | 0.370 | 0.260 | 0.260 | 0.010 ZrO$_2$ | — | — | 0.010 | 0.505 | 51.4 | 33000 | −16.1 |
| 36 | 0.050 | 0.360 | 0.300 | 0.260 | 0.030 SnO$_2$ | — | — | 0.030 | 0.426 | 46.2 | 22000 | −29.5 |
| 37 | 0.280 | 0.070 | 0.110 | 0.110 | 0.030 MnO$_2$ | — | — | 0.030 | 0.893 | 66.7 | 21000 | 48.7 |
| 38 | 0.220 | 0.420 | 0.170 | 0.170 | 0.020 CuO | — | — | 0.020 | 0.763 | 60.6 | 30000 | 22 |
| 39 | 0.240 | 0.200 | 0.210 | 0.200 | 0.140 NiO | 0.010 CoO | — | 0.150 | 0.767 | 46.9 | 29000 | −19.9 |
| 40 | 0.140 | 0.150 | 0.270 | 0.270 | 0.100 NiO | 0.070 ZrO$_2$ | — | 0.170 | 0.534 | 48.1 | 26000 | −26.3 |
| 41 | 0.200 | 0.260 | 0.300 | 0.200 | 0.010 NiO | 0.040 SnO$_2$ | — | 0.050 | 0.921 | 46.4 | 21000 | −24.0 |
| 42 | 0.100 | 0.370 | 0.270 | 0.240 | 0.010 NiO | 0.010 MnO$_2$ | — | 0.020 | 0.528 | 47.0 | 39000 | −7.3 |
| 43 | 0.270 | 0.390 | 0.120 | 0.190 | 0.010 NiO | 0.020 CuO | — | 0.030 | 0.795 | 50.5 | 35000 | 0.1 |
| 44 | 0.250 | 0.270 | 0.100 | 0.180 | 0.190 NiO | 0.010 WO$_2$ | — | 0.200 | 0.583 | 45.2 | 20000 | −23.5 |
| 45 | 0.080 | 0.350 | 0.267 | 0.300 | 0.002 CoO | 0.001 ZrO$_2$ | — | 0.003 | 0.447 | 46.2 | 23000 | −29.1 |
| 46 | 0.200 | 0.200 | 0.250 | 0.270 | 0.020 CoO | 0.060 SnO$_2$ | — | 0.080 | 0.722 | 55.7 | 38000 | 18.9 |
| 47 | 0.293 | 0.420 | 0.135 | 0.147 | 0.001 CoO | 0.004 MnO$_2$ | — | 0.005 | 0.996 | 54.0 | 34000 | 40.2 |
| 48 | 0.282 | 0.412 | 0.130 | 0.126 | 0.040 CoO | 0.010 CoO | — | 0.050 | 0.908 | 54.5 | 36000 | 22.5 |
| 49 | 0.250 | 0.385 | 0.115 | 0.110 | 0.130 CoO | 0.010 Wo$_3$ | — | 0.140 | 0.695 | 54.2 | 36000 | 0.0 |
| 50 | 0.250 | 0.300 | 0.200 | 0.100 | 0.070 ZrO$_2$ | 0.080 SnO$_2$ | — | 0.150 | 0.875 | 48.2 | 25000 | −26.3 |
| 51 | 0.080 | 0.150 | 0.290 | 0.230 | 0.240 ZrO$_2$ | 0.010 MnO$_2$ | — | 0.250 | 0.405 | 50.2 | 21000 | −29.3 |
| 52 | 0.225 | 0.225 | 0.175 | 0.175 | 0.150 ZrO$_2$ | 0.050 CuO | — | 0.200 | 0.641 | 46.6 | 38000 | 0.4 |
| 53 | 0.260 | 0.380 | 0.130 | 0.227 | 0.001 ZrO$_2$ | 0.002 WO$_3$ | — | 0.003 | 0.774 | 51.3 | 40000 | −5.3 |
| 54 | 0.215 | 0.400 | 0.189 | 0.194 | 0.001 SnO$_2$ | 0.001 MnO$_2$ | — | 0.002 | 0.782 | 55.3 | 36000 | 11.3 |
| 55 | 0.320 | 0.380 | 0.100 | 0.100 | 0.050 SnO$_2$ | 0.050 CuO | — | 0.100 | 0.949 | 46.8 | 37000 | 0.3 |
| 56 | 0.270 | 0.240 | 0.150 | 0.170 | 0.160 SnO$_2$ | 0.010 MnO | — | 0.170 | 0.750 | 65.2 | 21000 | 48.2 |
| 57 | 0.100 | 0.370 | 0.260 | 0.260 | 0.003 NiO | 0.003 CoO | 0.004 ZrO$_2$ | 0.010 | 0.505 | 51.3 | 35000 | −10.3 |
| 58 | 0.050 | 0.360 | 0.300 | 0.260 | 0.010 NiO | 0.010 SnO$_2$ | 0.010 | 0.030 | 0.426 | 47.4 | 38000 | −22.4 |
| 59 | 0.280 | 0.470 | 0.110 | 0.110 | 0.005 NiO | 0.015 CoO | 0.010 MnO$_2$ | 0.030 | 0.893 | 48.3 | 22000 | −28.5 |
| 60 | 0.220 | 0.420 | 0.170 | 0.170 | 0.010 NiO | 0.005 CoO | 0.005 CuO | 0.020 | 0.763 | 65.8 | 21000 | 47.6 |
| 61 | 0.240 | 0.200 | 0.210 | 0.200 | 0.010 NiO | 0.020 CoO | 0.120 WO$_3$ | 0.150 | 0.767 | 66.0 | 32000 | 13.5 |
| 62 | 0.140 | 0.150 | 0.270 | 0.270 | 0.160 ZrO$_2$ | 0.005 SnO$_2$ | 0.005 | 0.170 | 0.534 | 48.2 | 35000 | −5.2 |
| 63 | 0.200 | 0.250 | 0.300 | 0.200 | 0.010 CoO | 0.010 SnO$_2$ | 0.030 MnO$_2$ | 0.050 | 0.933 | 49.7 | 25000 | −29.1 |
| 64 | 0.100 | 0.370 | 0.270 | 0.240 | 0.010 CoO | 0.005 MnO$_2$ | 0.005 CuO | 0.020 | 0.528 | 45.9 | 29000 | −25.9 |
| 65 | 0.270 | 0.390 | 0.120 | 0.190 | 0.015 CoO | 0.005 CuO | 0.010 WO$_3$ | 0.030 | 0.795 | 46.9 | 37000 | −10.5 |
| 66 | 0.250 | 0.270 | 0.100 | 0.180 | 0.095 ZrO$_2$ | 0.100 SnO$_2$ | 0.005 MnO$_2$ | 0.200 | 0.583 | 53.7 | 34000 | 0.1 |
| 67 | 0.080 | 0.350 | 0.267 | 0.300 | 0.001 ZrO$_2$ | 0.001 SnO$_2$ | 0.001 WO$_3$ | 0.003 | 0.447 | 47.8 | 21000 | −26.3 |
| 68 | 0.200 | 0.200 | 0.250 | 0.270 | 0.060 SnO$_2$ | 0.010 MnO$_2$ | 0.010 CuO | 0.080 | 0.722 | 46.4 | 21000 | −29.8 |
| 69 | 0.293 | 0.420 | 0.135 | 0.147 | 0.002 SnO | 0.001 MnO$_2$ | 0.001 WO$_3$ | 0.005 | 0.996 | 5.71 | 36000 | 17.6 |
| *70 | 0.380 | 0.350 | 0.100 | 0.100 | 0.070 NiO | — | — | 0.070 | 1.246 | 85.2 | 2000 | 331.8 |
| *71 | 0.010 | 0.150 | 0.300 | 0.300 | 0.240 CoO | — | — | 0.240 | 0.260 | Unmeasurable | | |
| *72 | 0.310 | 0.520 | 0.080 | 0.080 | 0.010 ZrO$_2$ | — | — | 0.010 | 1.000 | 157.5 | 1000 | 326.7 |
| *73 | 0.320 | 0.100 | 0.200 | 0.200 | 0.180 SnO$_2$ | — | — | 0.180 | 0.977 | Unmeasurable | | |
| *74 | 0.200 | 0.150 | 0.350 | 0.250 | 0.050 MnO$_2$ | — | — | 0.050 | 1.000 | 38.0 | 1000 | −42.4 |
| *75 | 0.200 | 0.450 | 0.050 | 0.200 | 0.100 CuO | — | — | 0.100 | 0.429 | Unmeasurable | | |
| *76 | 0.100 | 0.300 | 0.200 | 0.350 | 0.040 NiO | 0.010 CoO | — | 0.050 | 0.364 | 34.6 | 4000 | −43.0 |

TABLE 2-continued

| Sample No. | a CaO | b TiO$_2$ | c La$_2$O$_3$ | d ZnO | ① | ② e MO$_x$ | ③ | ①+②+③ | (a + c/2)/ (b/2 + d + e) | Dielectric Constant εr | Q value | τf (ppm/°C.) |
|---|---|---|---|---|---|---|---|---|---|---|---|---|
| *77 | 0.320 | 0.350 | 0.200 | 0.050 CoO | 0.060 SnO$_2$ | 0.010 WO$_3$ | 0.010 | 0.080 | 1.377 | 136.9 | 7000 | 427.4 |
| *78 | 0.100 | 0.200 | 0.300 | 0.100 ZrO$_2$ | 0.200 CuO | 0.100 — | — | 0.300 | 0.500 | Unmeasurable | | |

Sample Numbers prefixed with * are comparative examples.

Example 2

Highly pure powdery calcium carbonate (CaCO$_3$), titanium oxide (TiO$_2$), lanthanum oxide (La$_2$O$_3$), zinc oxide (ZnO) and tungsten oxide (WO$_3$) were used as starting materials. These starting materials were weighed and blended in molar ratios listed in Table 3, and pure water was added to the resulting blend, which was in turn mixed and milled in wet process for about 20 hours by means of a ball mill until the average particle diameter of the blended materials was reduced to 2.0μm or smaller.

The resulting mixture was dried, and pre-fired at 1,150° C. for 2 hours. Then, 5 wt % of a binder was added to the pre-fired mixture, which was in turn granulated. The resulting powder was press-molded at a pressure of about 1 ton/cm$^2$ into a cylindrical form, which was in turn fired in an air atmosphere at a temperature of 1,450 to 1,650° C. for 2 hours, and then the firing temperature was reduced at a temperature reduction rate of 2 to 250° C. per hour down to 800° C.

The dielectric constant τr, Q value and resonant frequency temperature coefficient τf of the resulting dielectric ceramic product were measured in the same manner as in Example 1. The results are shown in Table 3.

Further, a surface of the ceramic product was polished to planarity and mirror-finished, and then the mirror-finished surface was observed in the following manner by means of a wavelength dispersive X-ray microanalyzer for determination of the presence of plate crystals in the ceramic product, the presence of W in the plate crystals and the volume percentage of the plate crystals. The volume percentage of the plate crystals in each ceramic product sample is shown in Table 3.

The presence of the plate crystals in the ceramic product was determined on the basis of reflective electron image photographs respectively taken at an acceleration voltage of 15 kV, a probe current of 5×10$^{-10}$ A and magnifications of 1,000, 2,000 and 5,000. The plate crystal portions looked more whitish than the other portions in the photographs. The whitish plate crystal portions in the photograph taken at a magnification of 2,000 were traced as black solid portions on a paper sheet, and the area ratio of the plate crystal portions to the other portions was determined by an image analysis (tradename "LUZEX"). The area ratio of the plate crystals thus determined was defined as the volume percentage of the plate crystals in the ceramic product.

The presence of W in the plate crystals was determined by application of a characteristic X-ray at an acceleration voltage of 15 kV and a probe current of 1.0×10$^{-7}$ A. As a result, W was contained in plate crystals in all the samples No. 79 to No. 105. Further, it was found that the plate crystals contained a greater amount of W than the other crystals.

As apparent from Table 3, dielectric ceramic products of comparative examples each had a lower dielectric constant and/or a lower Q value, or a r f value of lower than −30 ppm/° C. or greater than 50 ppm/° C.

On the contrary, dielectric ceramic products obtained in accordance with the present invention each had excellent dielectric characteristics, i.e., a dielectric constant of not lower than 45, a Q value of not lower than 20,000 at 1 GHz and a τf value of −30 to +50 ppm/° C.

It is noted that the molar fractions of the respective metal oxides in each ceramic product sample shown in Table 3 were the same as those in the starting formulation.

TABLE 3

| Sample No. | a CaO | b TiO$_2$ | c La$_2$O$_3$ | d ZnO | e WO$_3$ | (a + c/2)/ (b/2 + d + e) | Temperature reduction rate in firing (° C./hour) | Plate crystals (Vol %) | Dielectric Constant εr | Q value | τf (ppm/° C.) |
|---|---|---|---|---|---|---|---|---|---|---|---|
| 79 | 0.320 | 0.381 | 0.101 | 0.101 | 0.097 | 0.954 | 10 | 5.12 | 66.3 | 21000 | 49.0 |
| 80 | 0.270 | 0.235 | 0.155 | 0.170 | 0.170 | 0.760 | 4 | 6.27 | 50.5 | 36000 | −11.7 |
| 81 | 0.270 | 0.235 | 0.155 | 0.170 | 0.170 | 0.760 | 300 | 8.37 | 48.3 | 29000 | −10.0 |
| 82 | 0.100 | 0.365 | 0.265 | 0.260 | 0.010 | 0.514 | 4 | 1.21 | 48.2 | 39000 | −23.8 |
| 83 | 0.100 | 0.365 | 0.265 | 0.260 | 0.010 | 0.514 | 50 | 1.03 | 47.0 | 33000 | −22.5 |
| 84 | 0.050 | 0.360 | 0.300 | 0.260 | 0.030 | 0.426 | 100 | 2.44 | 45.0 | 22000 | −30.0 |
| 85 | 0.285 | 0.470 | 0.105 | 0.110 | 0.030 | 0.900 | 200 | 0.37 | 65.1 | 20000 | 50.0 |
| 86 | 0.230 | 0.420 | 0.170 | 0.160 | 0.020 | 0.808 | 40 | 0.09 | 63.5 | 35000 | 11.3 |
| 87 | 0.230 | 0.420 | 0.170 | 0.160 | 0.020 | 0.808 | 100 | 0.12 | 63.2 | 32000 | 11.1 |
| 88 | 0.230 | 0.210 | 0.210 | 0.200 | 0.150 | 0.736 | 2 | 4.84 | 48.0 | 31000 | −19.9 |
| 89 | 0.230 | 0.210 | 0.210 | 0.200 | 0.150 | 0.736 | 250 | 3.89 | 46.8 | 22000 | −18.5 |
| 90 | 0.150 | 0.150 | 0.260 | 0.270 | 0.170 | 0.544 | 20 | 3.94 | 46.7 | 24000 | −28.1 |
| 91 | 0.190 | 0.260 | 0.300 | 0.200 | 0.050 | 0.895 | 20 | 0.05 | 45.8 | 22000 | −27.3 |

TABLE 3-continued

| Sample No. | a CaO | b TiO$_2$ | c La$_2$O$_3$ | d ZnO | e WO$_3$ | (a + c/2)/ (b/2 + d + e) | Temperature reduction rate in firing (° C./hour) | Plate crystals (Vol %) | Dielectric Constant εr | Q value | τf (ppm/° C.) |
|---|---|---|---|---|---|---|---|---|---|---|---|
| 92 | 0.100 | 0.360 | 0.280 | 0.240 | 0.020 | 0.545 | 10 | 0.15 | 45.8 | 38000 | −9.6 |
| 93 | 0.270 | 0.400 | 0.120 | 0.180 | 0.030 | 0.805 | 70 | 0.63 | 52.2 | 36000 | 0.0 |
| 94 | 0.270 | 0.400 | 0.120 | 0.180 | 0.030 | 0.805 | 300 | 0.36 | 52.5 | 30000 | 0.4 |
| 95 | 0.260 | 0.260 | 0.100 | 0.180 | 0.200 | 0.608 | 2 | 7.31 | 46.9 | 20000 | −25.2 |
| 96 | 0.080 | 0.340 | 0.277 | 0.300 | 0.003 | 0.462 | 20 | 0.06 | 45.0 | 23000 | −29.4 |
| 97 | 0.190 | 0.200 | 0.260 | 0.270 | 0.080 | 0.711 | 10 | 0.38 | 54.4 | 39000 | 17.5 |
| 98 | 0.190 | 0.200 | 0.260 | 0.270 | 0.080 | 0.711 | 250 | 0.42 | 53.9 | 28000 | 16.6 |
| 99 | 0.260 | 0.380 | 0.105 | 0.110 | 0.145 | 0.702 | 200 | 2.80 | 53.5 | 37000 | 0.0 |
| 100 | 0.250 | 0.300 | 0.205 | 0.100 | 0.145 | 0.892 | 5 | 3.74 | 46.8 | 26000 | −28.7 |
| 101 | 0.080 | 0.150 | 0.295 | 0.225 | 0.250 | 0.414 | 20 | 9.58 | 48.9 | 20000 | −30.0 |
| 102 | 0.220 | 0.225 | 0.180 | 0.175 | 0.200 | 0.636 | 60 | 10.00 | 45.1 | 39000 | 0.0 |
| 103 | 0.220 | 0.225 | 0.180 | 0.175 | 0200 | 0.636 | 250 | 8.82 | 45.1 | 35000 | −0.3 |
| 104 | 0.250 | 0.380 | 0.130 | 0.237 | 0.003 | 0.733 | 70 | 0.06 | 51.7 | 40000 | −59 |
| 105 | 0.210 | 0.400 | 0.190 | 0.199 | 0.001 | 0.763 | 50 | 0.02 | 55.7 | 35000 | 10.3 |
| *106 | 0.380 | 0.350 | 0.100 | 0.100 | 0.070 | 1.246 | 50 | 2.01 | 80.4 | 2000 | 283.5 |
| *107 | 0.010 | 0.150 | 0.300 | 0.300 | 0.240 | 0.260 | 50 | 15.83 | | Unmeasurable | |
| *108 | 0.310 | 0.520 | 0.080 | 0.080 | 0.010 | 1.000 | 50 | 0.01 | 125.6 | 2000 | 380.2 |
| *109 | 0.320 | 0.100 | 0.200 | 0.200 | 0.180 | 0.977 | 50 | 12.77 | | Unmeasurable | |
| *110 | 0.200 | 0.150 | 0.350 | 0.250 | 0.050 | 1.000 | 50 | 1.58 | 30.5 | 3000 | −48.1 |
| *111 | 0.200 | 0.450 | 0.050 | 0.200 | 0.100 | 0.429 | 50 | 4.71 | 150.5 | 1000 | 593.0 |
| *112 | 0.100 | 0.300 | 0.200 | 0.350 | 0.050 | 0.364 | 50 | 009 | 24.5 | 3000 | −47.1 |
| *113 | 0.320 | 0.350 | 0.200 | 0.050 | 0.080 | 1.377 | 50 | 2.69 | 125.6 | 5000 | 315.6 |
| *114 | 0.100 | 0.200 | 0.300 | 0.100 | 0.300 | 0.500 | 50 | 20.43 | | Unmeasurable | |
| *115 | 0.250 | 0.300 | 0.250 | 0.200 | 0.000 | 1.071 | 50 | 0.00 | 49.3 | 5000 | 67.4 |

Sample Numbers prefixed with * are comparative examples.

What is claimed is:

1. A dielectric ceramic composition containing metal elements Ca, Ti, La, Zn and M which is at least one metal element selected from the group consisting of W, Ni, Co, Zr, Sn, Mn and Cu, and represented on a molar fraction basis by the following composition formula:

$aCaO \cdot bTiO_2 \cdot cLa_2O_3 \cdot dZnO \cdot eMO_x$ wherein M is defined above; $1 \leq x \leq 3$; and a to e are molar fractions which are defined as $0.050 \leq a \leq 0.320$, $0.150 \leq b \leq 0.470$, $0.100 \leq c \leq 0.300$, $0.100 \leq d \leq 0.300$ and $0 < e \leq 0.250$, respectively (a+b+c+d+e=1).

2. A dielectric ceramic composition as set forth in claim 1, wherein the molar fractions a, b, c, d and e satisfy the following expression:

$0.40 \leq \{a+(c/2)\}/\{(b/2)+d+e\} \leq 1.00$.

3. A dielectric ceramic composition as set forth in claim 1, which contains plate crystals.

4. A dielectric ceramic composition as set forth in claim 3, wherein the plate crystals are present in a proportion of 0.02 to 10 vol %.

5. A dielectric ceramic composition as set forth in claim 1, wherein the metal element M is tungsten (W), and the composition formula is:

$aCaO \cdot bTiO_2 \cdot cLa_2O_3 \cdot dZnO \cdot eWO_3$.

6. A dielectric ceramic composition as set forth in claim 5, which contains plate crystals.

7. A method of preparing a dielectric ceramic composition in a shape, the method comprising the steps of:

mixing oxides of metal elements which constitute a composition formula as recited in claim 1, and forming the resulting mixture into the shape; and firing the resulting shape at a firing temperature of 1,400 to 1,650° C.

8. A method as set forth in claim 7, further comprising the step of reducing the firing temperature at a rate of 2 to 300° C. per hour after the firing at a temperature of 1,400 to 1,650° C.

9. A dielectric resonator comprising:

a resonator medium composed of a dielectric ceramic composition as recited in claim 1; and a pair of output and input terminals disposed on opposite sides of the resonator medium, whereby a high frequency signal is applied between the input and output terminals to resonate the resonator medium at a resonant frequency.

10. A dielectric resonator comprising:

a resonator medium composed of a dielectric ceramic composition as recited in claim 5; and a pair of output and input terminals disposed on opposite sides of the resonator medium, whereby a high frequency signal is applied between the input and output terminals to resonate the resonator medium at a resonant frequency.

* * * * *